(12) United States Patent
Gordon

(10) Patent No.: US 9,839,327 B1
(45) Date of Patent: Dec. 12, 2017

(54) MULTI-POSITIONING DEVICE FOR THE HANDLING OF WARES

(71) Applicant: Live Beyond Urban, LLC, Collegeville, PA (US)

(72) Inventor: Melissa Gordon, Collegeville, PA (US)

(73) Assignee: Live Beyond Urban, LLC, Collegeville, PA (US)

( * ) Notice: Subject to any disclaimer, the term of this patent is extended or adjusted under 35 U.S.C. 154(b) by 0 days.

(21) Appl. No.: 15/467,376

(22) Filed: Mar. 23, 2017

Related U.S. Application Data

(60) Provisional application No. 62/412,579, filed on Oct. 25, 2016.

(51) Int. Cl.
    *A47J 45/07* (2006.01)
    *B65D 21/02* (2006.01)
    *A21B 3/15* (2006.01)

(52) U.S. Cl.
    CPC .............. *A47J 45/07* (2013.01); *A21B 3/15* (2013.01); *B65D 21/0209* (2013.01)

(58) Field of Classification Search
    CPC A45F 2005/1073; G01G 19/58; G01G 19/52; G01G 23/20; G01G 23/206; A45C 13/28; G09B 21/003; A47J 45/07; B65D 21/0209; A21B 3/15
    USPC ........................................................ 294/137
    See application file for complete search history.

(56) References Cited

U.S. PATENT DOCUMENTS

| | | | |
|---|---|---|---|
| 2,518,973 A * | 8/1950 | Atherton | A45C 13/28 177/131 |
| 3,191,830 A * | 6/1965 | Goetz | A45F 5/12 294/156 |
| 8,763,520 B1 | 7/2014 | Sanita | |
| 9,080,910 B1 * | 7/2015 | Zyman Beer | G09B 21/003 |
| 2002/0155259 A1 | 10/2002 | Kume et al. | |
| 2013/0113228 A1 * | 5/2013 | Gieseke | B65G 7/12 294/137 |
| 2013/0113229 A1 * | 5/2013 | Wu | H04M 1/04 294/138 |
| 2014/0017371 A1 | 1/2014 | Gattineri | |

FOREIGN PATENT DOCUMENTS

| | | |
|---|---|---|
| CN | 201365840 Y | 12/2009 |
| CN | 102059809 A | 5/2011 |
| EP | 1827187 B1 | 5/2011 |

* cited by examiner

*Primary Examiner* — Stephen A Vu
(74) *Attorney, Agent, or Firm* — White and Williams LLP

(57) ABSTRACT

A multi-positioning device for handling wares having a handle adjustable between multiple rotational positions. The handle may lock into various rotational positions for handling and storage of the device. The handle may include a slidable member at least partially contained within the handle and slidable between an extended position and a retracted position.

3 Claims, 17 Drawing Sheets

3

MULTI-POSITIONING DEVICE FOR THE HANDLING OF WARES

CROSS REFERENCE TO RELATED APPLICATIONS

This application claims the benefit of U.S. Provisional Patent Application Ser. No. 62/412,579, NOVEL MULTI-POSITIONING DEVICE FOR THE HANDLING OF WARES, filed 25 Oct. 2016, the contents of which is hereby incorporated by reference in its entirety.

FIELD OF THE INVENTION

The present invention relates to a novel multi-positioning device for handling wares. More particularly, the invention relates to a multi-positioning device that is capable of locking into multiple positions, each position with a specific purpose. One particular execution can be for bakeware.

BACKGROUND

Bakeware has not changed much in the last 50 years. In particular, there has been little innovation with regards to handling and efficiency. Most bakeware items do not have handles. And, if an item does have a handle, it is typically integrated into the body of the item, and thus the pseudo handle is difficult to grasp. Furthermore, these pseudo handles do not provide enough surface area to properly support movement of the item in and out of an oven. Many times, the baker's hand/mitt will penetrate into the food product(s).

New bakeware surfaces have been introduced, but they have fallen short in providing a durable non-stick surface. Current bakeware is difficult to handle, as described above. Also, multiple items are required to fully execute a food product, which leads to the need to clean and store multiple items. In turn, time and space is lost in using these multiple items.

As our lives become more complex and busy, our need for improved products grows. We need products that are easy to use and efficient, yet maintain or improve effectiveness of the job at hand.

SUMMARY OF THE INVENTION

The present invention may include a novel multi-positioning device having a mechanical mechanism that is adjustable to multiple positions. This mechanism locks into various positions for the desired function (e.g. handling, storage, etc.). For a bakeware execution, two of these multi-positioning devices may be used to promote ease of use. The multi-function use of this device may eliminate the need for multiple bakeware items. For example, the cooling rack position would eliminate the need for a cooling rack. Also, as these handles would be attached to the item as opposed to being integrated within the item, this allows for more optimal handling.

DESCRIPTION OF THE DRAWINGS

Some embodiments of the present invention are illustrated as examples and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly do defined herein.

A new multi-positioning device and its usage is described herein. In the following description, for purposes of explanation, numerous specific details are set forth in order to provide a thorough understanding of the present invention. It will be evident, however, to one skilled in the art that the present invention may be used without these specific details.

The present disclosure is to be considered as an exemplification of the invention, and is not intended to limit the invention to the specific embodiments illustrated by the figures or description below. The functionality of the invention is consistent, while the details/parts of the mechanism may assume different embodiments.

The present invention will now be described by referencing the appended figures representing one embodiment. FIG. 1, FIG. 2, FIG. 3 and FIG. 4 illustrate an assembled view of a multi-positioning device 1 (the "device") according to various embodiments of the present invention. In embodiments, each of the elements of the device 1 are configured to ensure ease of re-positioning. The size of the device 1 and items shown in all figures are only applicable to this execution. This device 1 and items can be resized, as needed, to fit other executions.

Figure 1:
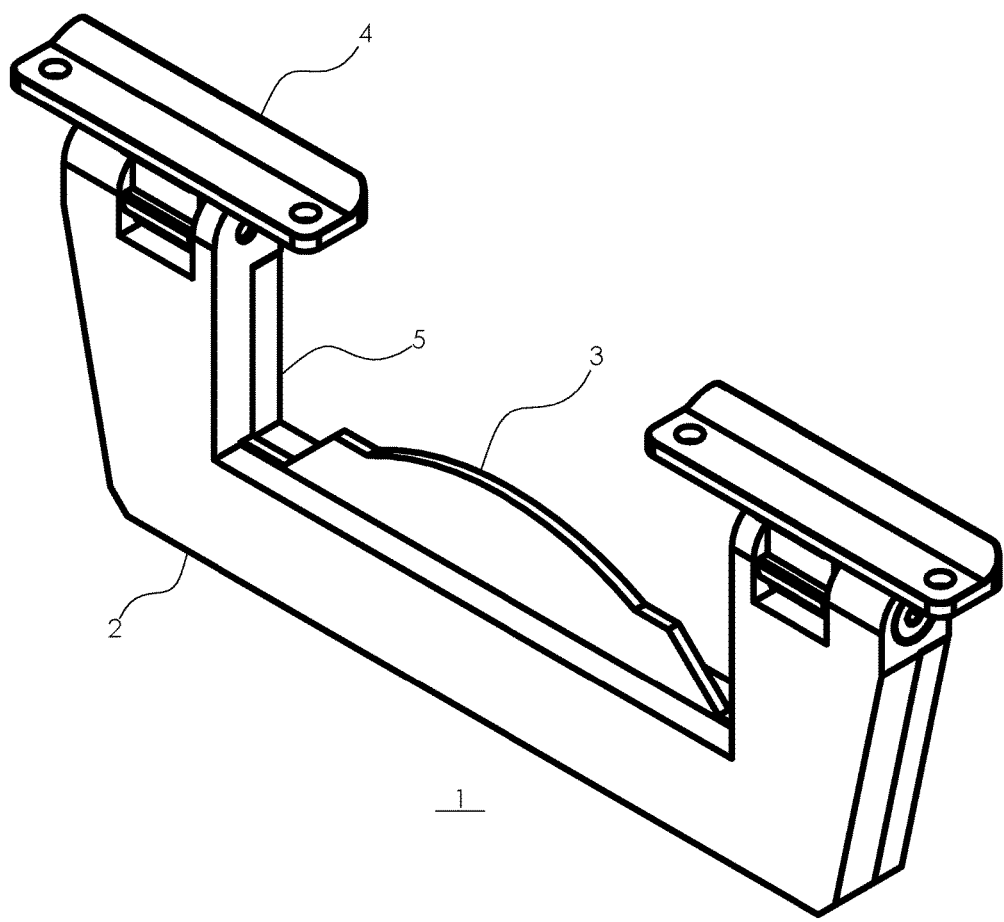
FIG. 1 illustrates an assembled view (isometric view) of one example of a multi-positioning device according to various embodiments described herein.

FIG. 1 depicts an overview of the device 1 (isometric view). In this view, the top housing 2, the insert 3, the connectors 4 and the bottom housing 5 are depicted. As described below, to reposition the device 1, the insert 3 is squeezed towards device 1 body. When released, the insert 3 locks into the closest notch in the connectors 4. The top housing 2 and the bottom housing 5 act as an enclosure for the device 1 components. One position of the device 1 may include a 90 degree downward angle that would allow the ware to function as a cooling rack; the devices acting as "legs". Another position may be "flat" for efficient storage. Another position may include a 45 degree upward angle that would provide for easy handling.

Figure 2:
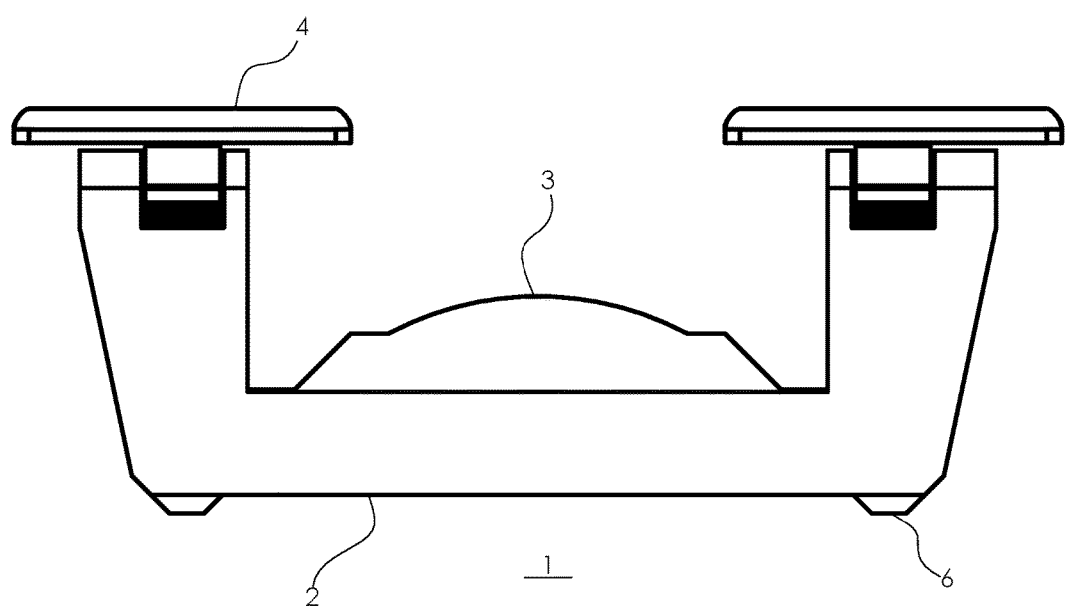
FIG. 2 illustrates an assembled view (front view) of one example of a multi-positioning device according to various embodiments described herein.

FIG. 2 depicts an overview of the device 1 (front view). In this view, one additional component of the device 1, the feet 6 are depicted. Each device 1 has two feet 6 that allow the device 1 to stand on a surface.

Figure 3:
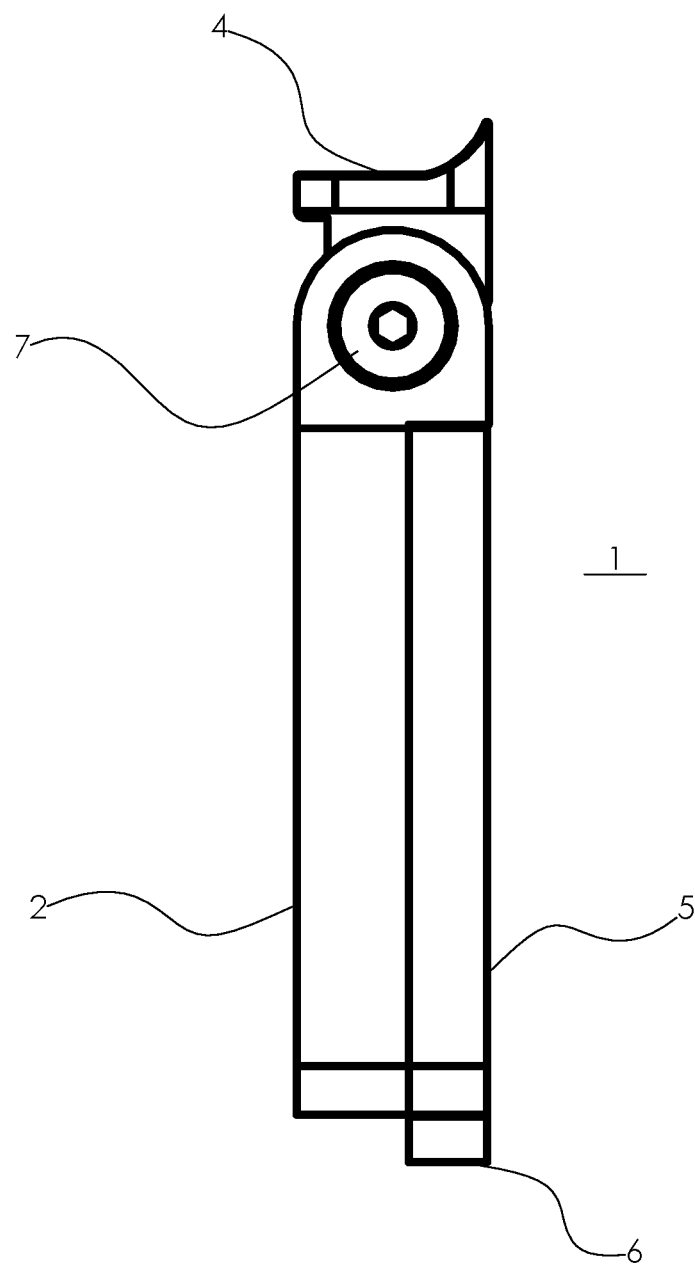
FIG. 3 illustrates an assembled view (side view) of one example of a multi-positioning device according to various embodiments described herein.

FIG. 3 depicts an overview of the device 1 (side view). In this view, one additional component of the device 1, the shoulder screws 7 are depicted. Each device 1 has two shoulder screws 7 on which the device 1 rotates so that different positions can be achieved.

Figure 4:
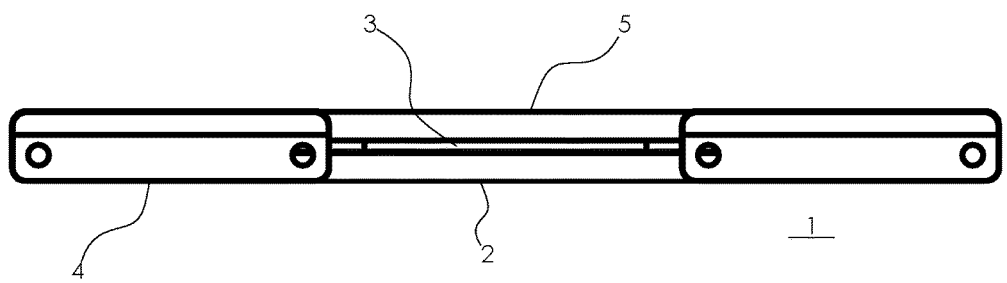
FIG. 4 illustrates an assembled view (top view) of one example of a multi-positioning device according to various embodiments described herein.

FIG. 4 depicts an overview of the device 1 (top view). In this view, the spatial relationship between the top housing 2, insert 3 and bottom housing 5 is depicted. The insert 3 sits between the top housing 2 and the bottom housing 5. In this view, the connectors 4 are also depicted.

Figure 5:
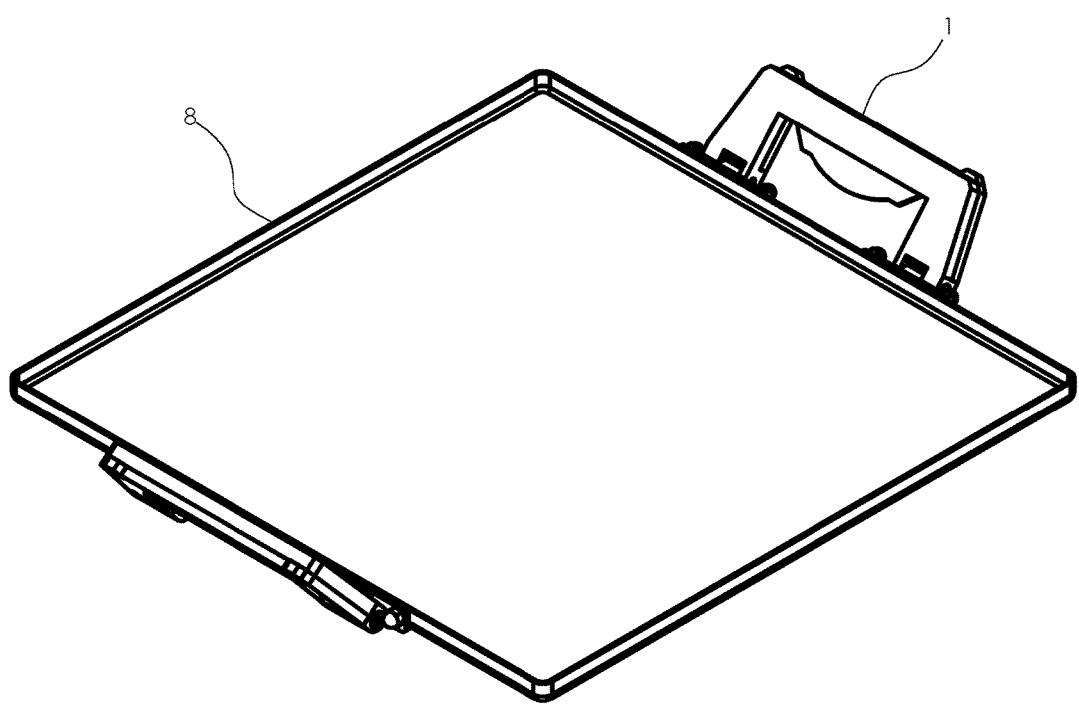
FIG. 5 illustrates a bakeware execution showing one position (45 degrees up) for a certain function using the multi-positioning device according to various embodiments described herein.

FIG. 5 depicts one embodiment of the device 1 in one position (45 degrees up) within the bakeware execution. In this figure, a subassembly 8 is also depicted. This subassembly 8 is shown as only one example of a ware in which the device 1 can be connected. This embodiment and position are provided as examples and do not represent the full spectrum of the potential for the device 1 nor does the design shown represent all of the different embodiments of the device 1. In this position, the ware can be easily maneuvered.

Figure 6:
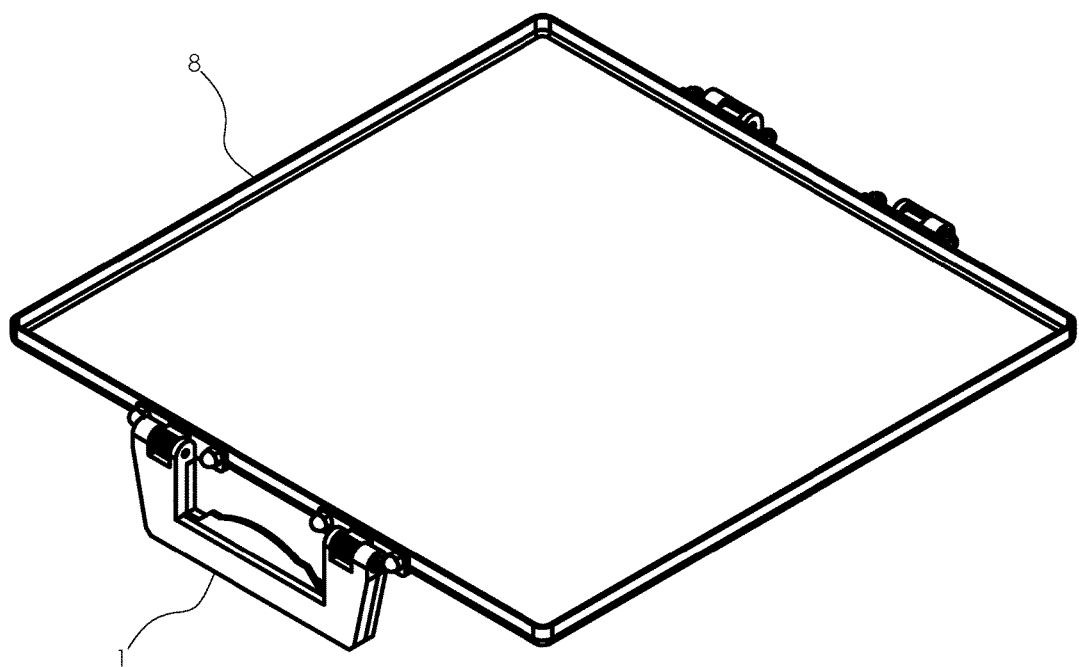
FIG. 6 illustrates a bakeware execution showing one position (90 degrees down) for a certain function using the multi-positioning device according to various embodiments described herein.

FIG. 6 depicts one embodiment of the device 1 in one position (90 degrees down) within the bakeware execution. In this figure, a subassembly 8 is depicted. This subassembly 8 is shown as only one example of a ware in which the device can be connected. This embodiment and position are provided as examples and do not represent the full spectrum of the potential for the device 1 nor does the design shown represent all of the different embodiments of the device 1. In this position, the ware can allow the food product to cool without having to transfer to another ware.

Figure 7:
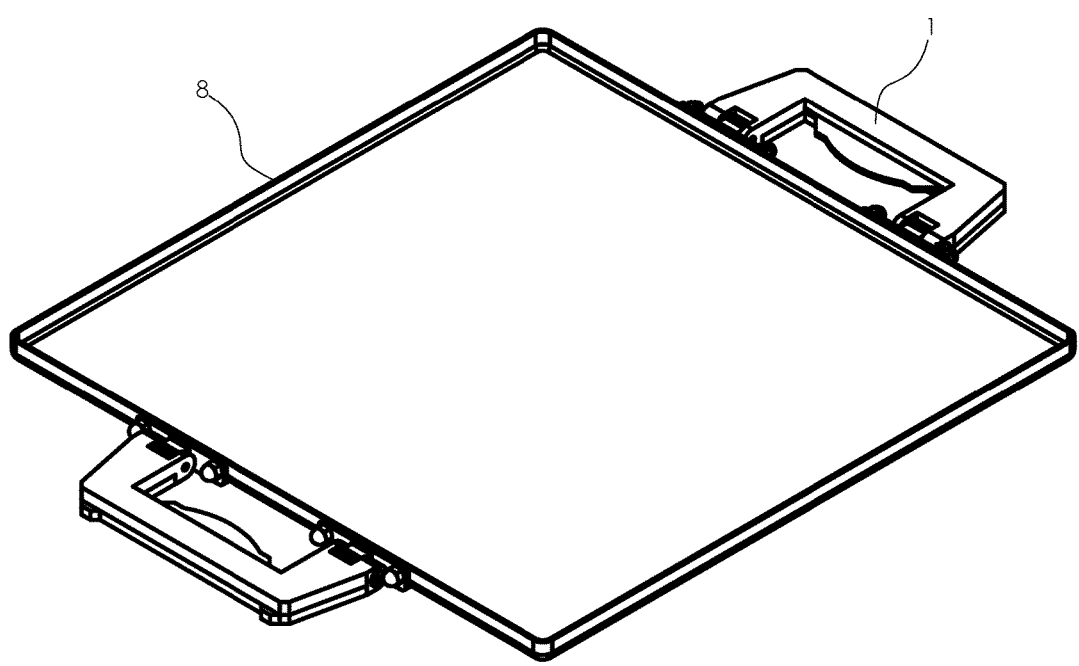
FIG. 7 illustrates a bakeware execution showing one position (flat) for a certain function using the multi-positioning device according to various embodiments described herein.

FIG. 7 depicts one embodiment of the device 1 in one position (flat) within the bakeware execution. In this figure, a subassembly 8 is depicted. This subassembly 8 is shown as only one example of a ware in which the device can be connected. This embodiment and position are provided as examples and do not represent the full spectrum of the potential for the device 1 nor does the design shown represent all of the different embodiments of the device 1. In this position, the ware can be stored in a streamlined manner.

Figure 8:
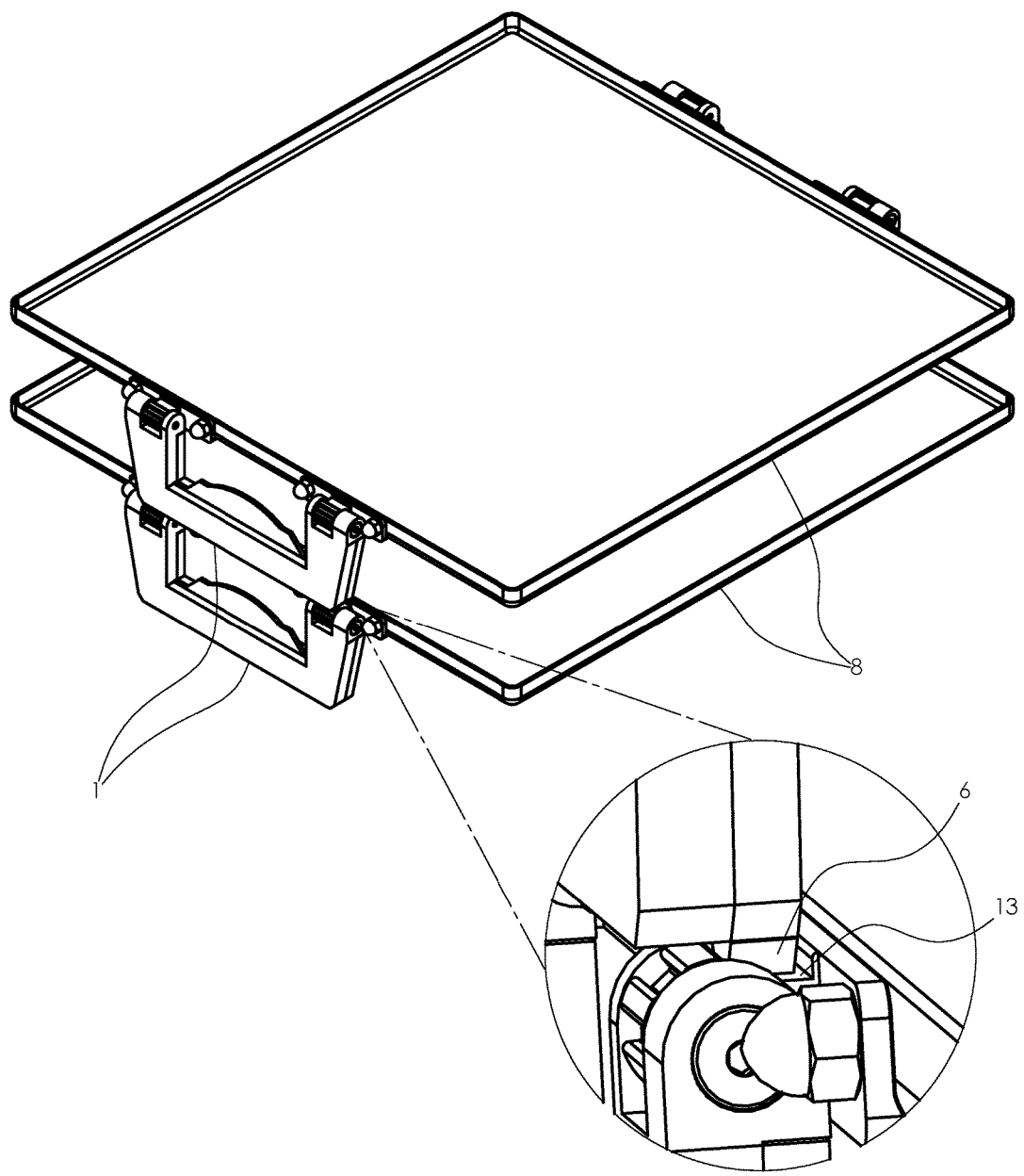
FIG. 8 illustrates two of the same bakeware executions in the 90 degrees down position (stacked) using the multi-positioning device according to various embodiments described herein.

FIG. 8 depicts two of the same bakeware execution in the 90 degrees down position (stacked) using the multi-positioning devices 1. In this figure, two subassemblies 8 are depicted to show stackability. The wares can be stacked by inserting the feet 6 into the notches 13 of the connectors 4. These subassemblies 8 are shown as only one example of a ware in which the device 1 can be connected. This embodiment and position are provided as examples and do not represent the full spectrum of the potential for the device 1 nor does the design shown represent all of the different embodiments of the device 1. In this position, the wares can be stacked to save valuable counter space.

Figure 9:
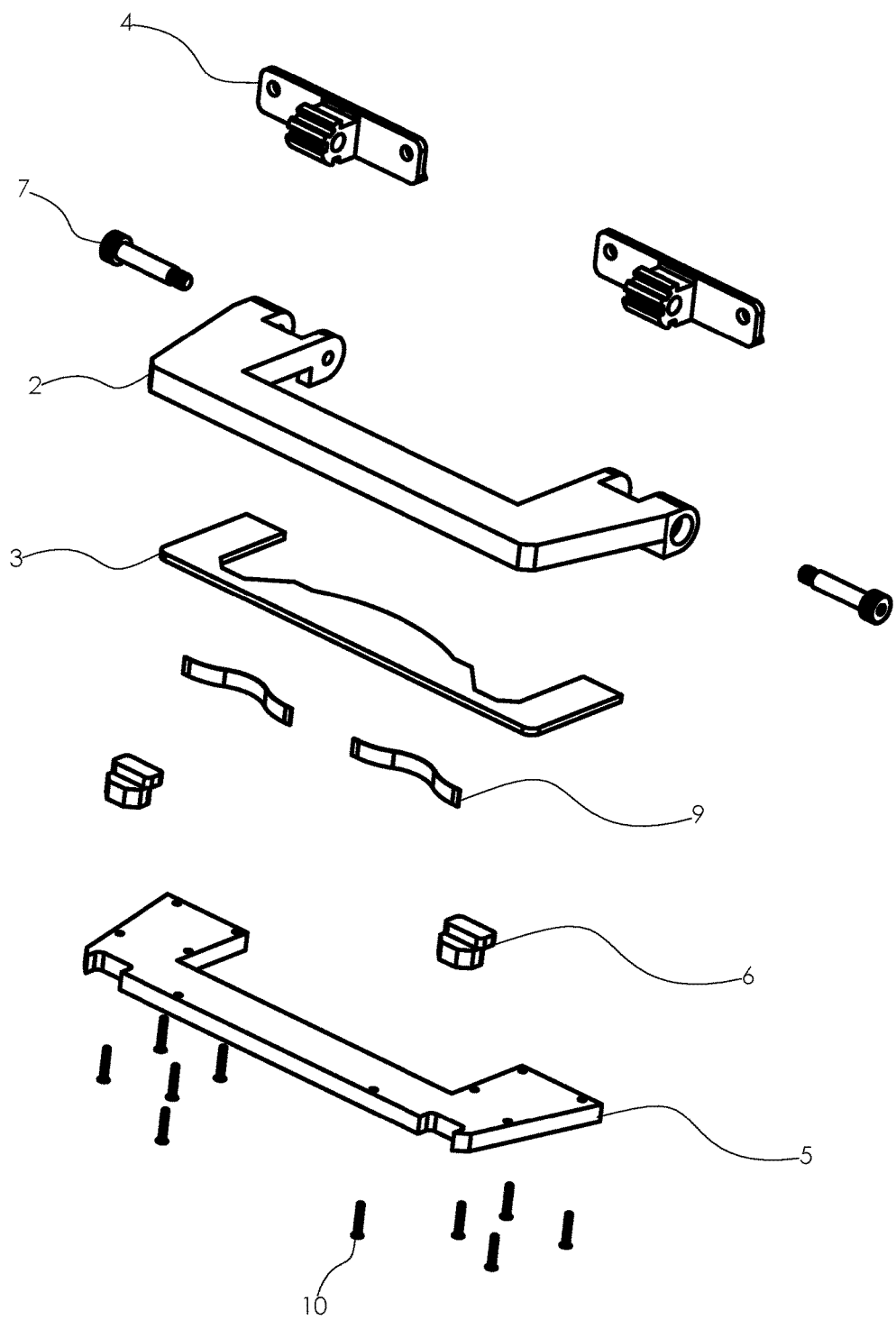
FIG. 9 illustrates an exploded view of one example of a multi-positioning device according to various embodiments described herein.

FIG. 9 depicts an exploded view of the device 1 which displays all of the components of the device 1, including top housing 2, an insert 3, linear springs 9, feet 6, shoulder screws 7, a bottom housing 5, screws 10, and connectors 4. Linear springs 9 provide tension for proper movement of the insert 3 during repositioning of the device 1. The linear springs 9 rest, unattached, in groves (not shown) in the top housing 2, and when the insert 3 is pressed, the springs 9 are compressed. There may be two linear springs 9 per device 1. Shoulder screws 7 provide the axis on which the device 1 rotates. There may be two shoulder screws 7 per device 1. The shoulder screws 7 are fed though the top housing 3 then though the connector 4, then back into a threaded cavity in the top housing 3. The top housing 3 and the bottom housing 5 are held together by fasteners 10. There may be two connectors 4 per device 1. The feet 6 allow the device 1 to stand on a surface.

Figure 10:
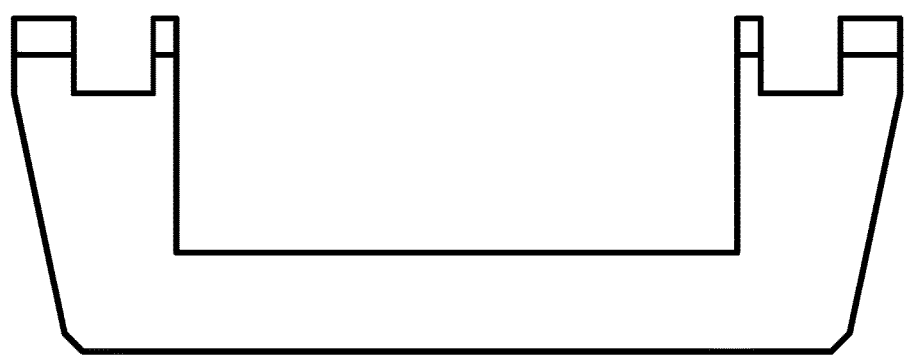
FIG. 10 illustrates one top housing of one example of a multi-positioning device according to various embodiments described herein.

FIG. 10 depicts the top housing 2. The top housing 2 acts as one half of the device 1 enclosure. It also contains the mechanical elements of the device 1, including the insert 3, feet 6, linear springs 9 and shoulder screws 7.

Figure 11:
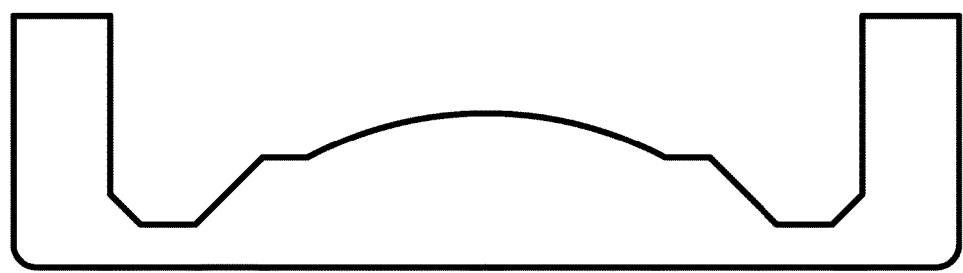
FIG. 11 illustrates one insert of one example of a multi-positioning device according to various embodiments described herein.

FIG. 11 depicts the insert 3. The insert 3 fits into grooves in the top housing 2, allowing it to slide towards and away from the device 1 body when it is squeezed and subsequently let go. When the insert 3 is squeezed into a retracted position, the device 1 can be repositioned. The insert 3 is removed from the current notch and can pivot about the connectors 4 to reposition into another notch. When the insert 3 is let go, it will lock into the closest notch in the connectors 4. The insert 3 travels between three positions under tension from linear springs 9.

Figure 12:
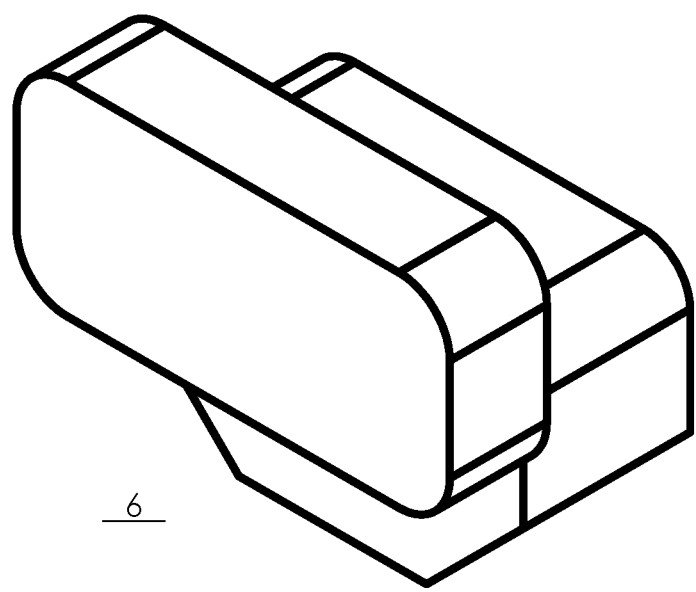
FIG. 12 illustrates one foot of one example of a multi-positioning device according to various embodiments described herein.

FIG. 12 depicts the foot 6. There are two (2) feet 6 per device 1. These feet 6 act as stands, e.g. cooling rack position, for the ware and may protect surfaces from damage in the case that a hot ware is placed on a counter that is not heat safe, provided the feet 6 are made of heat dissipating material such as silicone. The feet 6 may allow wares to be stackable, as these feet 6 fit into notches on the connector 4.

Figure 13:
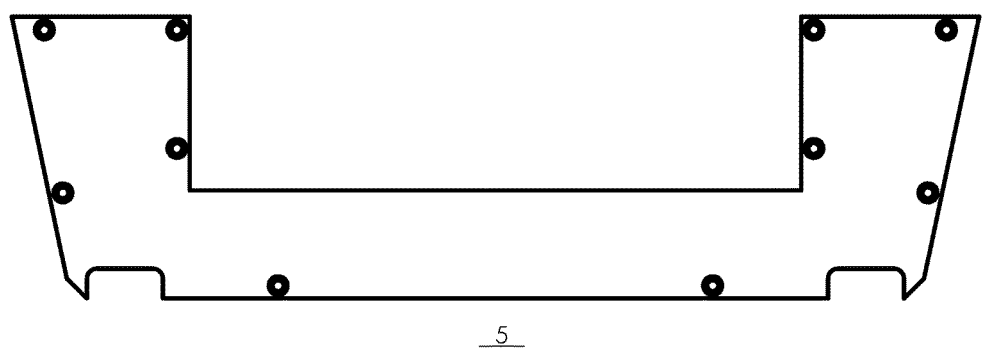
FIG. 13 illustrates one bottom housing of one example of a multi-positioning device according to various embodiments described herein.

FIG. 13 depicts the bottom housing 5. The bottom housing 5 acts as the other half of the device 1 enclosure.

Figure 14:
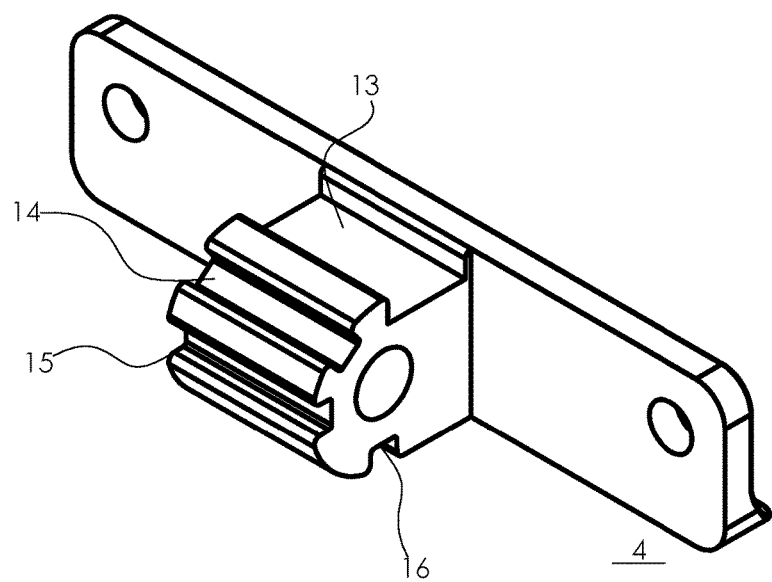
FIG. 14 illustrates one connector of one example of a multi-positioning device according to various embodiments described herein.

FIG. 14 depicts the connector 4. There are two (2) connectors 4 that are the connection points between the device 1 and the ware. Each connector 4 has holes in which studs can be fed through. In this example, studs are welded to the ware. The connectors 4 have multiple notches (one for each position) where the insert 3 locks into place. When the insert 3 is engaged in notch 14, the device 1 is in the 45 degree up position. When the insert 3 is engaged in notch 15, the device 1 is in the flat position. When the insert 3 is engaged in notch 16, the device 1 is in the 90 degrees down position. Top notch 13 may accommodate at least a portion of feet 6 so that the wares can be stacked.

Figure 15:
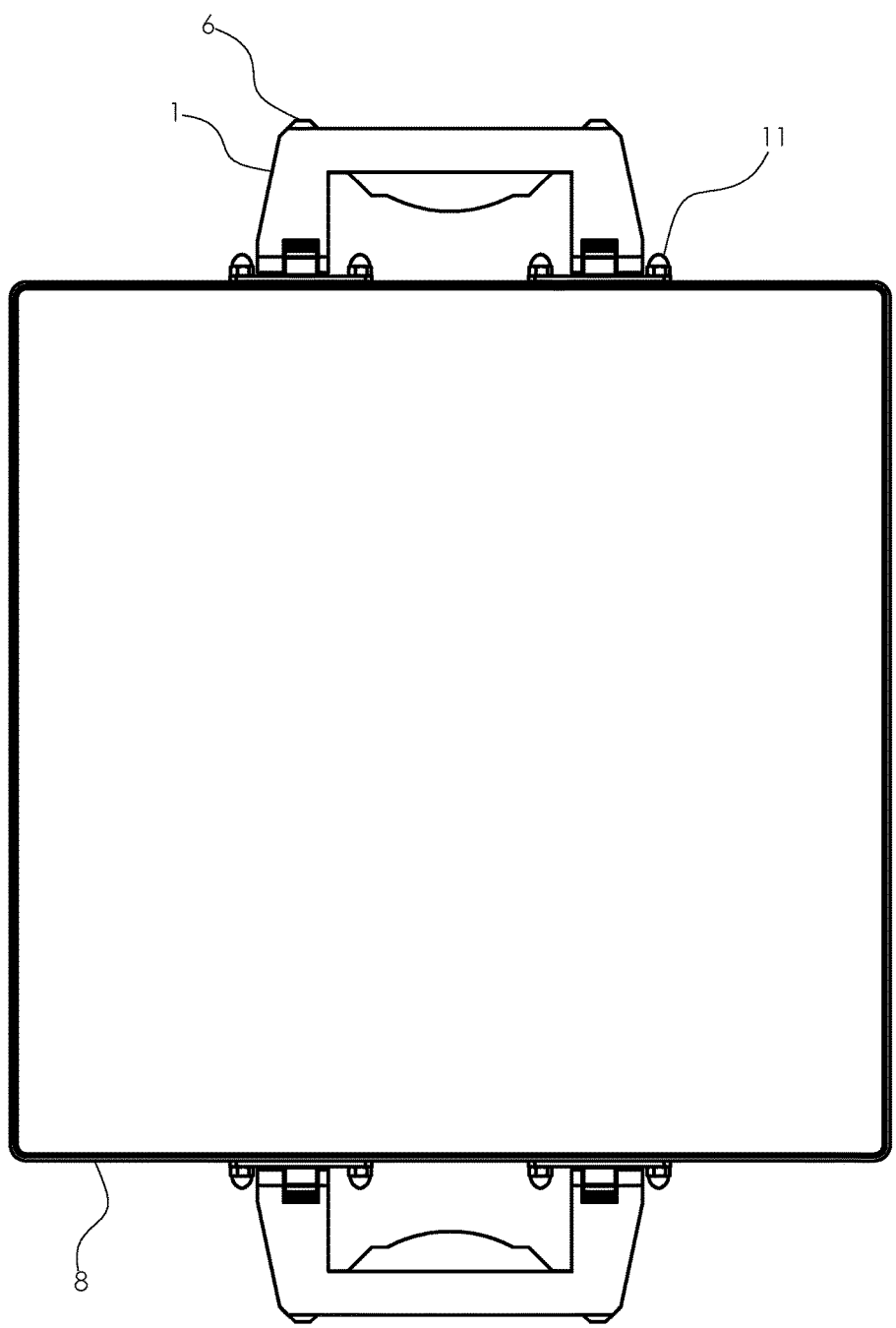
FIG. 15 illustrates one bakeware execution using the multi-positioning device according to various embodiments described herein.

FIG. 15 depicts one bakeware execution using two (2) of the multi-positioning devices 1. In this figure, subassembly 8, the feet 6, and caps 11 are depicted. The caps 11 are used to secure the connectors 4 to the studs 12. These subassemblies 8 are shown as only one example of a ware in which the device 1 can be connected. This embodiment is provided as an example and does not represent the full spectrum of the potential for the device 1 nor does the design shown represent all of the different embodiments of the device 1.

Figure 16:
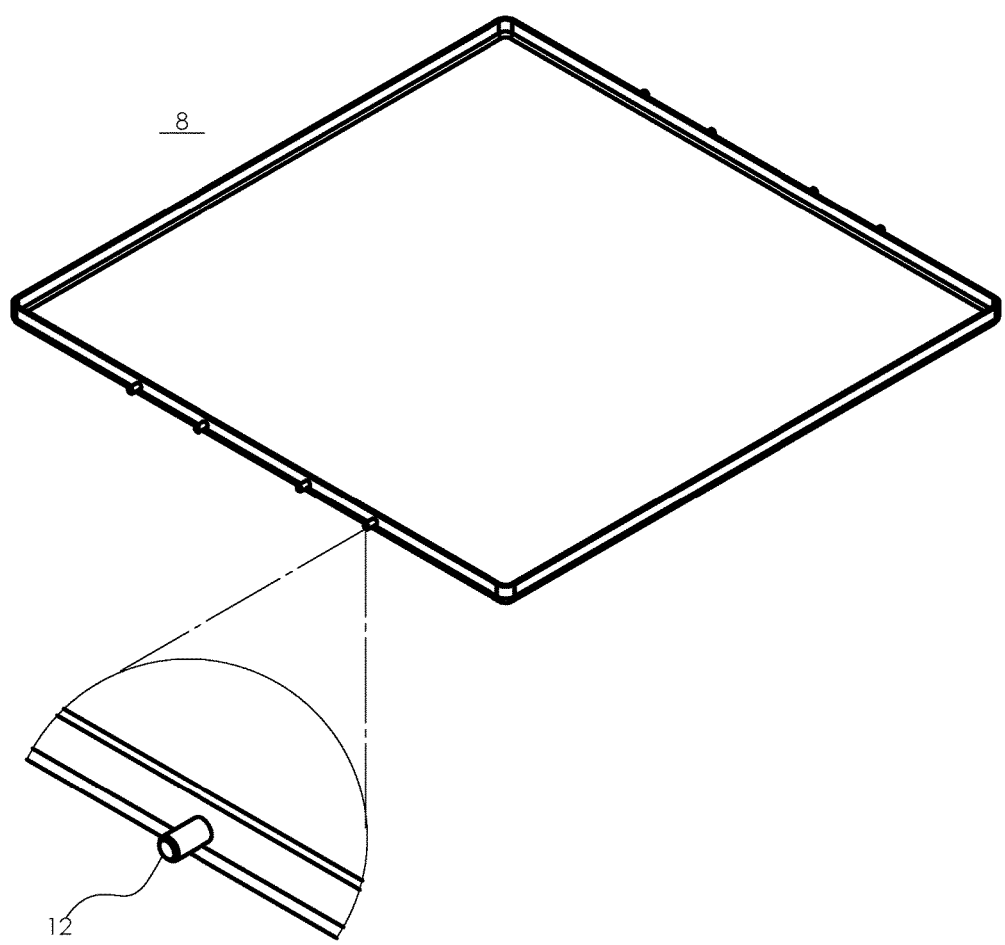
FIG. 16 illustrates a subassembly of one bakeware execution using the multi-positioning device according to various embodiments described herein.

FIG. 16 depicts a subassembly 8 of one bakeware execution where the multi-positioning devices 1 may be used. This subassembly 8 consists of a metal substrate and attaches to the devices 1 via the connectors 4. The studs 12 where the connectors are placed are depicted here. The subassembly 8 is not the focus of this patent.

Figure 17:
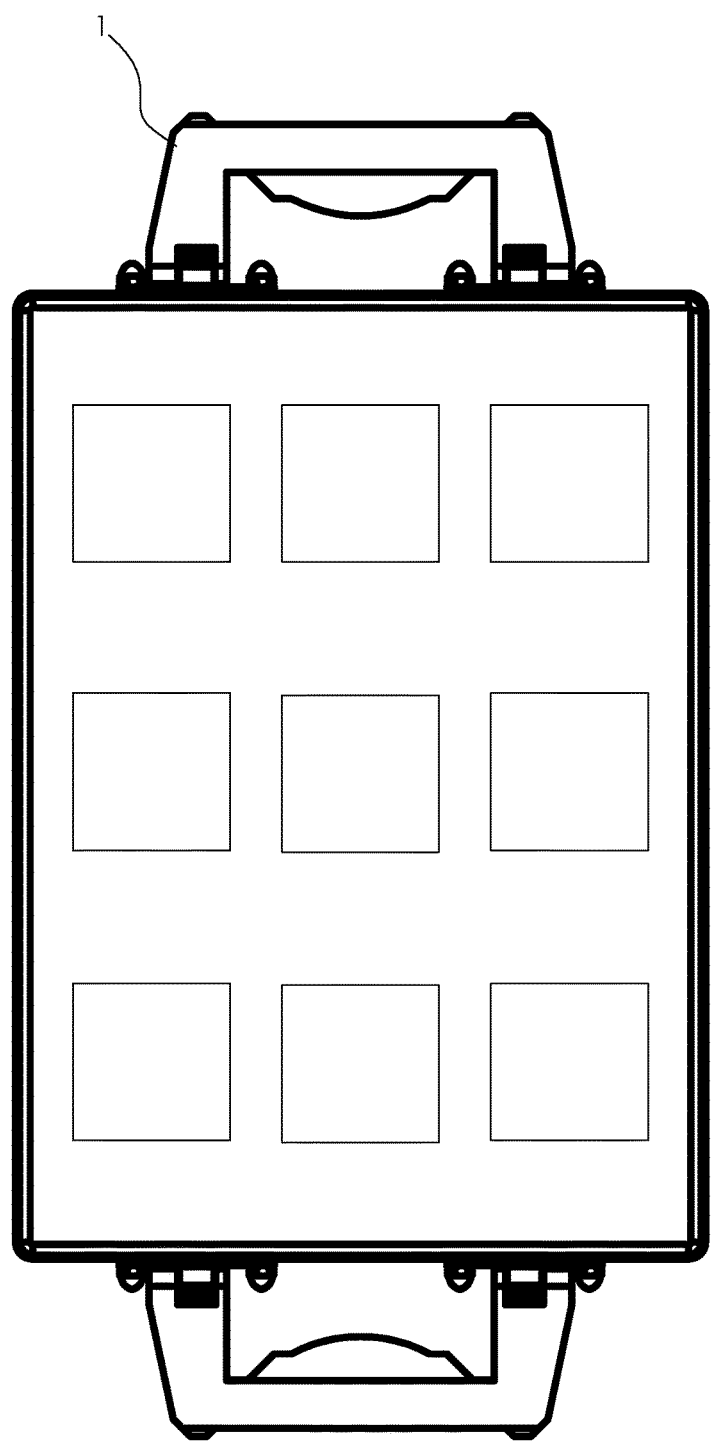
FIG. 17 illustrates another bakeware execution using the multi-positioning device according to various embodiments described herein.

FIG. 17 depicts another embodiment within the bakeware execution where the devices 1 may be used. This is provided as an example and does not represent the full spectrum of the potential for the device 1 nor does the design shown represent all of the different embodiments of the device 1.

While materials for the device 1 elements in this embodiment are stainless steel, aluminum or metal alloys, the device 1 is not limited to these materials. Other materials may comprise some or all of the elements of the multi-positioning device 1 in various embodiments of the present invention. Also, in the current embodiment, the feet 6 are made of silicone or like materials, however the feet 6 are not limited to such materials in different embodiments.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, and contemplated thereby, and are intended to be covered by the following claims.

What is claimed is:

1. A device for handling a ware, the ware having two coupling interfaces, the device comprising:
    a handle comprising two arms;
    a slidable member at least partially contained within the handle and slidable between an extended position and a retracted position and having two insertable portions; and
    two connectors, each of the two connectors mechanically coupled to one of the two coupling interfaces, and each of the two connectors rotatably coupled to one of the two arms of the handle and comprising a projection having a first notch and a second notch capable of accommodating the insertable portions of the slidable member when the slidable member is in the extended position,
    wherein when the slidable member is in the extended position, the insertable portions of the slidable member are inserted into one of the first notch and the second notch of the connectors, thereby causing the handle to be in a fixed rotational position with respect to the connectors, and
    wherein when the slidable member is in the retracted position, the insertable portions of the slidable member are not inserted into one of the first notch and a second notch of the connectors, thereby allowing the handle to rotate about the connectors.

2. The device of claim 1, wherein the handle contains one or more spring mechanisms in mechanical contact with the slidable member and assist sliding movement of the slidable member toward the extended position and resist sliding movement of the slidable member away from the extended position.

3. The device of claim 1, where the handle further comprises two feet each capable of interfacing with a top portion of one of two connectors of a second device, thereby allowing stacking of the device and corresponding ware atop the second device and corresponding ware.

* * * * *